(12) United States Patent
Rautenbach

(10) Patent No.: US 11,204,047 B2
(45) Date of Patent: Dec. 21, 2021

(54) WORKING SYSTEM INCLUDING A PNEUMATIC ACTUATOR

(71) Applicant: Festo SE & Co. KG, Esslingen (DE)

(72) Inventor: Klaus Rautenbach, Esslingen (DE)

(73) Assignee: FESTO SE & CO. KG, Esslingen (DE)

( * ) Notice: Subject to any disclaimer, the term of this patent is extended or adjusted under 35 U.S.C. 154(b) by 0 days.

(21) Appl. No.: 17/105,773

(22) Filed: Nov. 27, 2020

(65) Prior Publication Data

US 2021/0164500 A1 Jun. 3, 2021

(30) Foreign Application Priority Data

Nov. 28, 2019 (DE) .......................... 102019218485.5

(51) Int. Cl.
F15B 15/28 (2006.01)
F15B 15/02 (2006.01)

(52) U.S. Cl.
CPC .......... *F15B 15/2815* (2013.01); *F15B 15/02* (2013.01)

(58) Field of Classification Search
CPC ............ F15B 11/006; F15B 2013/0409; F15B 13/086; F15B 2211/6336
See application file for complete search history.

(56) References Cited

U.S. PATENT DOCUMENTS

| | | | | |
|---|---|---|---|---|
| 4,711,267 A * | 12/1987 | Schwelm | ............ | F15B 11/006 137/596.15 |
| 5,765,975 A | 6/1998 | Hoffmann et al. | | |
| 6,626,082 B2 * | 9/2003 | Morita | ................. | F15B 11/006 91/465 |
| 6,715,400 B2 * | 4/2004 | Muth | .................... | F15B 11/006 137/269 |
| 7,021,191 B2 * | 4/2006 | Moler | ..................... | F15B 9/09 91/393 |
| 8,036,799 B2 * | 10/2011 | Ingenbleek | .......... | F15B 11/006 701/51 |
| 10,408,238 B2 * | 9/2019 | Wang | .................... | F15B 21/085 |
| 10,619,655 B2 * | 4/2020 | Molnar | ................. | F15B 11/076 |
| 10,675,768 B2 * | 6/2020 | Ozog | .................. | B25J 11/0055 |
| 10,697,476 B2 * | 6/2020 | Wirtl | .................... | F15B 11/006 |
| 10,774,857 B2 * | 9/2020 | Neumann | ............. | F15B 11/006 |

FOREIGN PATENT DOCUMENTS

| | | |
|---|---|---|
| DE | 3933759 A1 | 4/1991 |
| DE | 102007007165 A1 | 8/2008 |
| DE | 202019103328 U1 | 8/2019 |
| DE | 102018107951 A1 | 10/2019 |
| EP | 2035193 A1 | 3/2009 |

* cited by examiner

*Primary Examiner* — Michael Leslie

(74) *Attorney, Agent, or Firm* — Hoffmann & Baron, LLP

(57) ABSTRACT

Working system for an application of force onto a workpiece, with a pneumatic actuator having an actuator housing designed to be fixed to a manipulator and a moveable element designed to couple an end effector and movably received on the actuator housing, and with a controller having a valve arrangement for a compressed air supply to the pneumatic actuator, has a position sensor system for determining a spatial position of the pneumatic actuator and for providing position-dependent electrical position sensor signals, and a processing system for processing the position sensor signals and for providing control signals to the valve arrangement, the processing system being designed for controlling a pneumatic supply to the pneumatic actuator as a function of the position sensor signals.

11 Claims, 2 Drawing Sheets

WORKING SYSTEM INCLUDING A PNEUMATIC ACTUATOR

BACKGROUND OF THE INVENTION

The invention relates to a working system for applying a force to a workpiece, such as can be used for a contact-bound surface treatment of a workpiece or for a contact-bound measurement of a surface of the workpiece.

SUMMARY OF THE INVENTION

The task of the invention is to provide a working system with which a precise machining and/or scanning of a workpiece surface can be realized with a small technical effort.

This task is solved for a working system of the type mentioned above as follows:

The working system has a pneumatic actuator, which comprises an actuator housing which is designed to be fixed to a manipulator and further comprises a moveable element which is designed to be coupled to an end effector and which is movably mounted on the actuator housing.

Furthermore, the working system comprises a controller which comprises a valve arrangement for a supply of compressed air to the pneumatic actuator, a position sensor system for determining a spatial position or orientation of the pneumatic actuator and for providing position-dependent electrical position sensor signals, and a processing system for processing the position sensor signals and for providing control signals to the valve arrangement, the processing system being designed for controlling a pneumatic supply to the pneumatic actuator as a function of the position sensor signals.

The manipulator has the task of influencing a spatial orientation of the working system in at least one spatial direction.

As an example, the manipulator can be designed as a tripod or a Scara robot or as a multi-axis robot.

The pneumatic actuator is used to provide a relative movement between the moveable element and the actuator housing depending on at least one fluid flow, which is supplied to the pneumatic actuator and/or discharged from the pneumatic actuator.

Preferably, the pneumatic actuator is designed to provide a linear relative movement between the moveable element and the actuator housing.

The relative movement of the pneumatic actuator can be used to influence a force transmission between a manipulator and the end effector, in particular to ensure that the force from the end effector to a workpiece is as constant as possible.

Furthermore, the working system includes a controller to control the relative to movement between the moveable element and the actuator housing.

For influencing the at least one fluid flow to or from the pneumatic actuator, the controller comprises a valve arrangement. This valve arrangement serves to influence a fluidically communicating connection between a compressed air source and the pneumatic actuator and/or between the pneumatic actuator and an air outlet.

For example it is intended that the valve arrangement comprises one or more, preferably electrically controllable, valves, which are adjustable between an open state and a closed state and with the help of which the fluid inflow to the pneumatic actuator and/or the fluid outflow from the pneumatic actuator can be influenced.

Furthermore, the controller comprises a position sensor system, in particular an absolute position transducer system or an attitude sensor system, which is designed to determine the spatial position or orientation of the pneumatic actuator.

The position sensor system comprises one or more position sensors wherein all of the respective position sensors are based on the same measuring principle or at least one of the respective position sensors is based on a different, second measuring principle. The position sensor system provides at least one electrical position sensor signal to the processing system.

As an example it is provided that the position sensor system can provide an electrical position sensor signal to the processing system, from which the spatial position of a movement axis for the moveable element of the pneumatic actuator can be calculated.

The movement axis can be determined by the linear movement of the moveable element relative to the actuator housing.

The processing system can be designed as a microcontroller or microprocessor and is preferably provided for the processing of a permanently stored computer program or an interchangeably stored computer program. The computer program allows the calculation of at least one control signal which is based on the electrical position sensor signals and which is provided to the valve arrangement.

It is preferably provided that the processing system can provide several control signals for the valve arrangement, provided that the valve arrangement also comprises several valves.

It is provided that the processing system carries out a cyclically recurring or acyclic calculation of control signals depending on the position sensor signals in order to ensure that a predetermined maximum value or a predetermined minimum value, in particular a maximum force to be applied to the workpiece or a minimum force to be applied to the workpiece, is maintained.

Such a control of the pneumatic supply of the pneumatic actuator by the processing system is also called a closed-loop control.

Advantageous further developments of the invention are subject of the subclaims.

It is useful if the end effector is selected from the group: processing tool for contact-based workpiece processing, measuring tool for contact-based workpiece measurement.

As an example, the processing tool can be designed as a grinding device, in which a drive motor sets an abrasive material into motion, in particular into a rotational motion, and the abrasive tool is pressed onto a workpiece surface by means of the working system and, if necessary, moved relative to the workpiece surface in order to thereby enable surface processing of the workpiece.

Alternatively, the processing tool can also be an assembly tool to carry out a joining process on the workpiece, whereby a defined application of force from the working system to the workpiece is required.

Another alternative of a processing tool is a welding device or welding torch, which is designed to weld similar layers of material or different layers of material. The pressure forces required for the welding process are applied to the workpiece by the working system without providing a counter support which is necessary with conventional welding guns.

In another alternative, the end effector can be designed as a measuring tool, for example to carry out a contact-based scanning of a workpiece surface, in which case a measuring tool attached to a measuring sensor is pressed onto the surface of the tool with a defined force in order to obtain information about the surface geometry of the workpiece by scanning a large number of measuring points.

It is advantageous if the actuator housing is connected to a manipulator, especially to an end arm of a multi-axis industrial robot, which industrial robot allows setting a spatial orientation of the end effector.

Depending on the design of the end effector, which can be designed as a machining tool or as a measuring tool, the task of the manipulator is to align the end effector in a spatial orientation with respect to a surface of the workpiece to be machined.

For example, if the processing tool is designed as a welding tool, it may be intended to ensure that the processing tool is always aligned normal (transverse) to the surface of the workpiece to be processed.

Preferably, it is intended that the manipulator includes a manipulator control, in which a geometry of the workpiece to be machined is stored. The manipulator control also has information about the design of the manipulator, of the pneumatic actuator and of the end effector. This allows the manipulator control to perform a control of drivable joints of the manipulator in order to ensure a predetermined alignment of the end effector with respect to the surface of the machined workpiece.

According to a further embodiment of the invention, it is provided that the pneumatic actuator is designed as a double-acting pneumatic cylinder and that the moveable element is designed as a working piston, in particular as a piston rod with a working piston arranged at the end, which is accommodated in a cylinder bore in the actuator housing so as to be linearly movable. The working piston and bore in the actuator housing delimit a size-variable first working space and a size-variable second working space. The processing system is configured for controlling a differential pressure between the first working space and the second working space in order to influence a relative position of the working piston with respect to the actuator housing.

By using a double-acting pneumatic cylinder as a pneumatic actuator, a maximum force which can be transmitted from the pneumatic actuator to the end effector can be set by adjusting the differential pressure between the first working chamber and the second working chamber.

By setting an absolute pressure level for the first pressure in the first working chamber and for the second pressure in the second working chamber, a stiffness of the pneumatic actuator can be adjusted, which can be selected depending on the characteristics of the end effector and the requirements of the workpiece processing.

For example, it may be advantageous to have a high stiffness, i.e. an overall high pressure level in both the first working space and the second working space, in order to perform a rough surface machining of the workpiece, for example in a rough grinding process.

On the other hand, when carrying out a fine surface machining of the workpiece, for example in finishing grinding, a low stiffness, i.e. a low pressure level in both the first workspace and the second workspace, can be provided.

Alternatively, the pneumatic actuator can be operated exclusively as a compensating element, which can be used to compensate for any overshooting movements and resulting force peaks at a contact point or contact surface between the end effector and the surface of the workpiece.

It is generally assumed that the pneumatic actuator with the end effector attached to it and the controller form a self-sufficient assembly which is attached to the manipulator and which, apart from an electrical power supply and a compressed air supply, does not require any interfaces, in particular no data transmission, neither from the assembly to the manipulator nor from the manipulator to the assembly with the manipulator.

This allows the assembly comprising the pneumatic actuator, the end effector and the controller to be easily attached to different manipulators and used for different purposes without having to consider a manipulator control and the associated adjustments in the communication between the controller and the manipulator control.

Preferably, a first pressure sensor, which is designed to provide a first electrical pressure signal to the processing system, is arranged at the first working chamber or at a supply line extending between the valve arrangement and the first working chamber, and a second pressure sensor, which is designed to provide a second electrical pressure signal to the processing system, is arranged at the second working chamber or at a supply line extending between the valve arrangement and the second working chamber.

The first pressure sensor and the second pressure sensor enable a precise determination of a differential pressure between the first working chamber and the second working chamber and, knowing the geometries of the pneumatic actuator, in particular the diameter of the working piston and the piston rod attached thereto, a determination of a force which can be provided by the pneumatic actuator.

Furthermore, with the aid of first pressure sensor signals of the first pressure sensor and second pressure sensor signals of the second pressure sensor the processing system determines a stiffness value for the respective current operating state of the pneumatic actuator. This stiffness value is dependent from an absolute pressure level which is determined from these first and second pressure signals, provided that the pneumatic actuator is designed as a double-acting pneumatic cylinder.

In a further embodiment of the invention it is provided that the valve arrangement comprises a first proportional valve arrangement which is designed for a pneumatic supply of the first working chamber and which is designed for influencing a fluid connection between a compressed air source and the first working chamber and for influencing a fluid connection between the first working chamber and an air outlet. Furthermore the valve arrangement comprises a second proportional valve arrangement which is designed for influencing a fluid connection between a compressed air source and the second working chamber and for influencing a fluid connection between the second working chamber and an air outlet.

Both the first and the second proportional valve arrangement can each be composed of several proportional valves, in particular 2/2-way proportional valves, which are in particular electrically controllable or fluidically controllable proportional valves.

Each of the proportional valve arrangements is connected to the respective working chamber and to a compressed air source and an air outlet, to which a silencer may be assigned.

Accordingly, each of the first and second proportional valve arrangement can effect ventilation of the working chamber by opening a fluid connection between the compressed air source and the working chamber and can effect deareation by opening a fluid connection between the respective working chamber and the air outlet.

Preferably, the first and second proportional valve arrangements are connected to the same compressed air source and to the same air outlet to ensure that the working system is as compact as possible.

It is advantageous if the first and/or the second proportional valve arrangement comprises at least one proportional valve, in particular designed as a piezo bender valve, with a position sensor. The position sensor being designed to provide an electrical position signal to the processing system which is dependent on a valve position of the proportional valve. Furthermore the valve arrangement may have a supply connection, which is designed for a fluidically communicating connection to the compressed air source, wherein a supply pressure sensor being arranged between the supply connection and the valve arrangement, which supply pressure sensor is designed to provide an electrical supply pressure signal to the processing system.

By using a proportional valve to which a position sensor is assigned, the processing system may calculate a valve cross-section of the respective proportional valve, wherein this calculation is based on the electrical position signal of the position sensor. This calculation allows an improved electrical control for the proportional valve.

As an example, the electrical position signal can be used to ensure a more precise operation of the proportional valve and thus a more precise adjustment of the pressure difference between the two working chambers in the pneumatic actuator.

In addition or alternatively, it is provided that a supply pressure sensor is assigned to a supply connection of the valve arrangement to determine a supply pressure.

This is particularly important if the working system is connected to a larger compressed air network in which pressure variations in the supply pressure can occur due to the activities of other compressed air consumers that are also connected to the compressed air network.

These pressure variations can be compensated, at least within a certain range, by a respective control of the proportional valves by the processing system, to achieve that the pressure difference in the pneumatic actuator is at least almost independent from the available supply pressure.

It is advantageous if the processing system is designed for a position-independent control of a maximum force exertable by the pneumatic actuator on the end effector on the basis of the position sensor signals.

With such a maximum force control, variations of the forces transmitted between the end effector and the workpiece can be avoided, at least to a large extent. These variations can result, for example, from a movement of the manipulator, which can lead to oscillations of the manipulator, the pneumatic actuator and the end effector attached to it and thus could cause a deterioration of the processing quality for the workpiece.

Furthermore, the position sensor signals enable a partial or full compensation of weight force influences, which can result from different spatial orientations of the pneumatic actuator and the attached end effector.

As an example, it can be assumed that an arrangement of the end effector below the pneumatic actuator (first situation) during the execution of the workpiece machining process will result in a higher machining force to the workpiece than an arrangement of the end effector above the pneumatic actuator (second situation), if the position sensor signals are not taken into account.

During the first situation the weight of the end effector and the weight of the moveable element additionally act on the workpiece and thus contribute to an increase in force which is applied to the workpiece. During the second situation the weight of the actuator and the end effector act on the manipulator and thus lead to a reduction of the force which is applied to the workpiece.

If the spatial position of the moveable element and the end effector is taken into account by including the position sensor signals, it is ensured that the working force transmitted from the processing tool to the workpiece is always the same, at least within a pre-defined tolerance interval.

In further embodiment of the invention it is provided that the processing system is designed for a position-independent control of a position of the moveable element with the end effector attached thereto relative to the actuator housing based on the position sensor signals.

Such a position control is of particular interest if the end effector is designed, for example, for mounting a component to the workpiece and a precise spatial alignment of the component with respect to the workpiece must be ensured during an assembly process. This mounting process may be impaired by the influence of weight forces acting in spatially different ways. A compensation of this spatial alignment is effected via the position sensor signals and the processing of these position sensor signals in the processing system.

BRIEF DESCRIPTION OF THE DRAWINGS

An advantageous embodiment of the invention is shown in the drawing.

Here shows.

DETAILED DESCRIPTION

Figure 1:
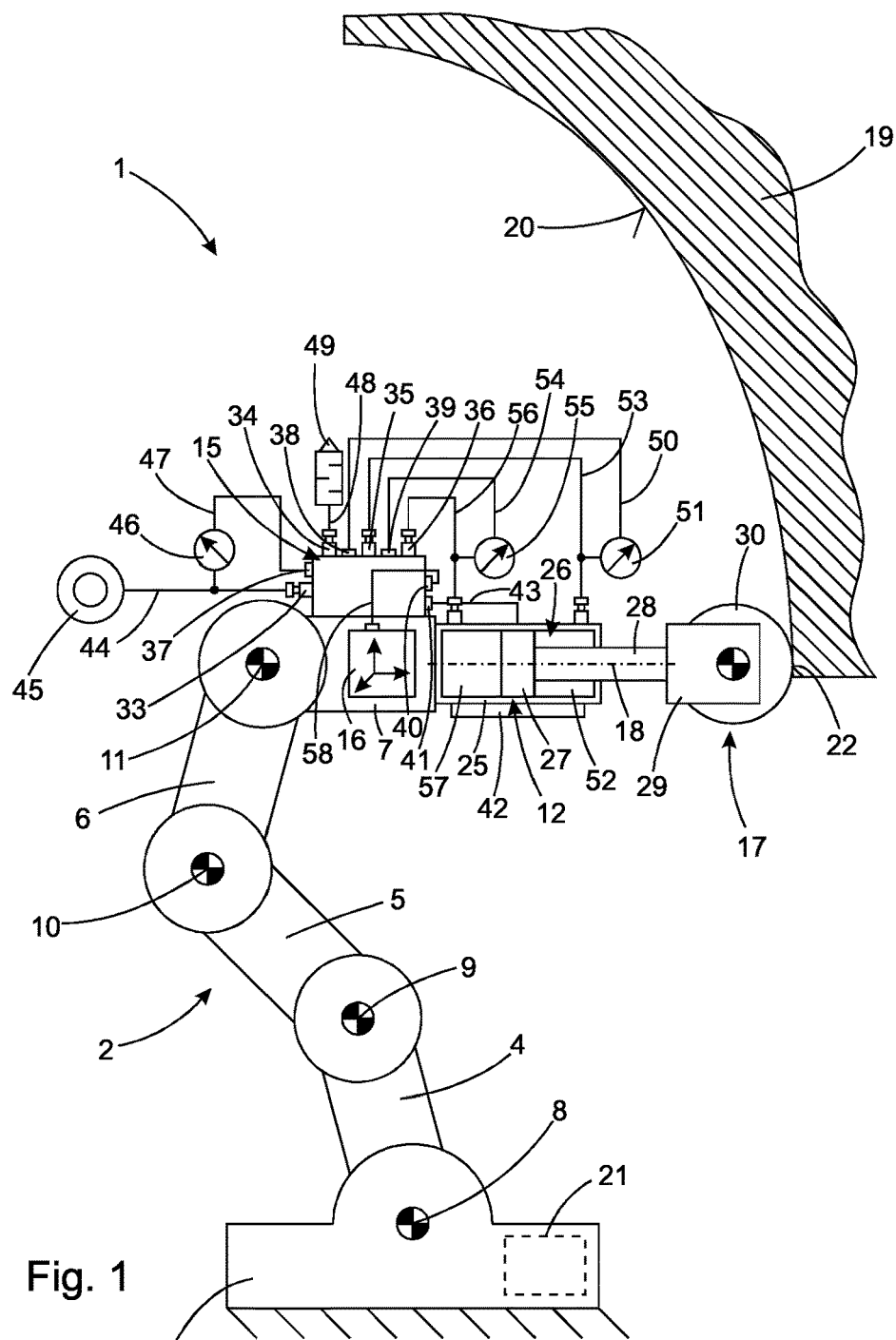
FIG. 1 a strictly schematic representation of a working system which is designed for processing a workpiece and which comprises a manipulator, a pneumatic actuator, a controller and an end effector, FIG. 2 a schematic diagram of the controller for the working system as shown in FIG. 1, and FIG. 3 a schematic representation of a proportional valve for the controller as shown in FIG. 2.

A working system 1 shown in FIG. 1 comprises a manipulator 2 which is designed as a multi-axis industrial robot and which is fixedly mounted with a machine base 3 in an unspecified production hall. The manipulator 2 comprises several arm sections 4, 5, 6 and 7, which are articulated to one another with joints 8, 9, 10, 11.

The joints 8 to 11 can each be designed as pure swivel joints with a precisely defined swivel axis or as ball joints with a plurality of swivel axes; the illustration according to FIG. 1 is only intended to show that the arm sections 4 to 7 are connected to each other in a swivelable manner and the joints 8 to 11 each have at least one swivel axis.

On arm section 7, which can also be described as a hand axis, a pneumatic actuator 12 is attached. For example the pneumatic actuator 12 is a double-acting pneumatic cylinder, to which a controller 15, a position sensor system 16 and an end effector, for example a grinding unit 17, are assigned.

The pneumatic actuator 12 is designed to provide a linear relative movement for the grinding unit 17 in relation to the arm section 7 along a movement axis 18 and serves to influence a maximum force which can be transmitted from manipulator 2 via the grinding unit 17 to a workpiece surface 20 of a workpiece 19.

As an example, a manipulator control 21 is provided for actuating the manipulator 2, in particular the joints 8 to 11, each of which is provided with drives which are not shown in detail, whereby the manipulator control 2, knowing the geometry of the workpiece surface 20, is designed to align the grinding unit 17 with respect to the workpiece surface 20 in such a way that the movement axis 18 always intersects a contact point 22 between the grinding unit 17 and the workpiece surface 20 and is thus aligned transversely to the workpiece surface 20.

In order to ensure advantageous machining of the workpiece 19, it is intended to keep the moving mass (the combination of the moveable element and the processing tool), which is in contact with the workpiece surface 20 as low as possible.

Accordingly, the pneumatic actuator 12 serves to decouple the manipulator 2, which has a high mass and high inertia, from the grinding unit 17.

The task of the pneumatic actuator 12 is to ensure that movements of the manipulator 2 do not influence the application of an at least almost constant force to the workpiece surface 20 by the grinding unit 17. Thus the of a spatial orientation of the manipulator 2 and the assembly formed by the pneumatic actuator 12 with the controller 15 and the position sensor system 16 and the grinding unit 17 is compensated by a respective control of the pneumatic actuator 12.

As an example, it is provided that the pneumatic actuator 12 is designed as a double-acting pneumatic cylinder, wherein the pneumatic actuator 12 has an actuator housing 25 which is designed with an end face for fixing to the arm section 7, also referred to as the hand axis of the manipulator 2. Furthermore the actuator housing 25 has a recess 26 extending along the movement axis 18, also referred to as the cylinder bore.

In the recess 26, a working piston 27 is accommodated so that it can be displaced along the movement axis 18 and is connected to a piston rod 28 which penetrates the actuator housing 25 at an end face facing away from the hand axis 7 and carries the milling unit 17 at the end.

The working piston 27 and the piston rod 28 form the linearly moveable element of the pneumatic actuator 12, which is mounted on the actuator housing 25.

The grinding unit 17, which is attached to the end of the piston rod 28, comprises a drive section 29, which has a drive motor (not shown in detail) and an abrasive tool 30 in the form of a grinding roller and is designed for a rotation about an axis of rotation perpendicular to the plane of representation of FIG. 1.

The controller 15 comprises four fluid connections 33, 34, 35 and 36, which are described in connection with FIG. 2 below.

Furthermore, the controller 15 also includes five electrical connections 37, 38, 39, 40, and 41, which are designed for the connection of electrical and electronic components.

The controller 15 is connected to a compressed air source 45 via a pneumatic supply line 44.

It is also provided that a supply pressure sensor 46 is assigned to the pneumatic supply line 44 to detect a pneumatic pressure prevailing in the supply line 44.

The supply pressure sensor 46 is electrically connected to the electrical connection 37 of the controller 15 via a sensor line 47.

The fluid connection 34 is connected to a silencer 49 via an exhaust air line 48.

The electrical connection 38 is connected via a sensor line 50 to a first pressure sensor 51, which is designed for determining a pneumatic pressure in a first working chamber 52 of the pneumatic actuator 12 and which is coupled to a first compressed air line that connects the first working chamber 52 in fluid communication with the fluid connection 35 of the controller 15.

Furthermore, a sensor line 54 is connected to an electrical connection 39, which is designed to transmit electrical pressure signals from a second pressure sensor 55.

The second pressure sensor 55 is coupled to a second compressed air line 56, which extends between a second working chamber 57 of the pneumatic actuator 12 and the assigned fluid connection 36 of the controller 15.

Furthermore, a sensor line 58 is connected to an electrical connection 40 of the controller 15, which is connected to the position sensor system 16, so that position sensor signals can be transmitted from the position sensor system 16 to the controller 15.

In addition, a sensor line 43 of a position sensor 42 is connected to an electrical connection 41, which can be used to determine a position of the working piston 27 along the movement axis 18.

Figure 2:
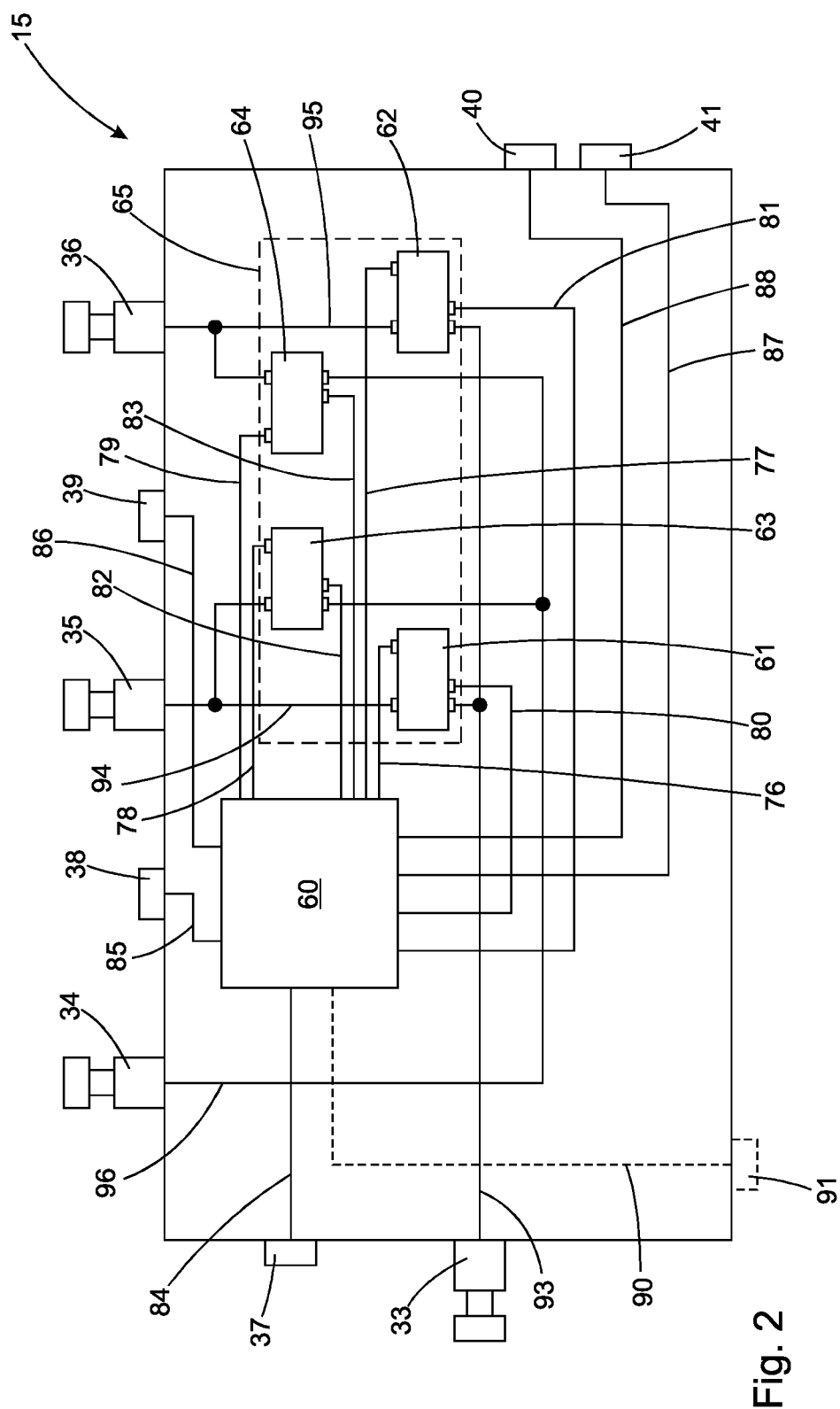

The controller 15 according to FIG. 1 is shown in detail in FIG. 2.

As an example, the controller 15 comprises a processing system 60 which is designed as a microprocessor or microcontroller and a valve arrangement 65 which is composed of several proportional valves 61, 62, 63, 64 described in more detail below.

Figure 3:
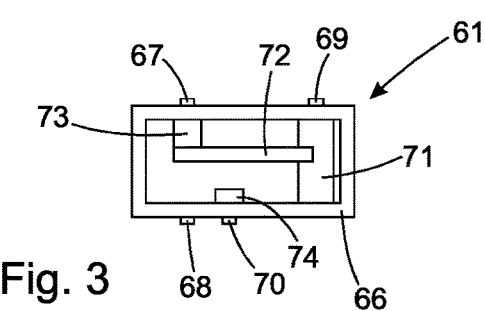

It is assumed that all proportional valves 61 to 64 are designed in the same way and have a structure as shown in FIG. 3.

The proportional valve 61 shown in FIG. 3 comprises a valve housing 66, on which an inlet connection 67, an outlet connection 68, a supply connection 69 and a sensor connection 70 are formed.

The inlet port 67 is intended for a connection to a fluid line (not shown in FIG. 3), which is used to supply fluid to the valve body 66.

Outlet port 68 is designed for connection to a fluid line (not shown in FIG. 3) to drain fluid from valve body 66.

The supply port 69 is intended for the electrical supply of a valve actuator realized as a bender 72, especially made of a piezoelectric material, which is mounted in the valve housing 66 on a bender holder 71.

In a neutral position, the bender 72 closes a valve seat assigned to the input port 67 and in an unspecified open position, it can partially or completely release the valve seat 73.

Preferably, the bender 72 allows a free adjustment of a valve cross-section between the input port 67 and the output port 68 depending on electrical control signals provided at the supply port 69.

Preferably, this valve cross-section is proportional to a control signal provided at the supply port 69 for the respective proportional valve 61.

A sensor 74 is associated with the bender 72, which sensor 74 is designed to detect a position of the bender 72 and which sensor 74 is electrically coupled to the sensor port 70, so that an electrical sensor signal from the sensor 74 can be provided via the sensor port 70 and a sensor line (not shown in FIG. 3) to the processing system 60 as shown in FIG. 2.

As shown in FIG. 2, the proportional valves 61 and 62 are each connected to a compressed air line 93 connected to fluid port 33 and to a working line 94 or 95 assigned to the respective fluid port 35 or 36, thus allowing to influence a compressed air flow from fluid port 33 to fluid port 35 or 36, respectively.

The two proportional valves 63 and 64 are each arranged between the assigned working line 94 or 95 and an exhaust air line 96 connected to the fluid connection 34 and enable an influence on a fluidically communicating connection between the respective fluid connection 35 or 36 and the fluid connection 34 in order to be able to effect, for example, a venting of the respective working chamber 52 or 57 of the pneumatic actuator 12.

Each of the proportional valves 61 to 64 is connected to the processing system 60 via an assigned control line 76, 77, 78, 69, so that control signals of the processing system 60 can be provided to the respective proportional valves 61 to 64 via the respective individual control line 76 to 79.

Furthermore, each of the proportional valves 61 to 64 is connected to the processing system 60 via an assigned sensor line 80, 81, 82, 83 so that the processing system 60 can receive and process the sensor signals of the respective sensors 74 assigned to the respective proportional valves 61 to 64.

Furthermore, the processing system 60 is connected to the electrical connections 38, 39 and 40 via assigned sensor lines 84, 85, 86, so that the processing system 60 can receive and process electrical pressure signals from the supply pressure sensor 46 or the first pressure sensor 51 or the second pressure sensor 55.

In addition, a sensor line 87 is associated with the processing system 60 and is connected to the electrical connector 40, which is intended for connection to the position sensor system 16 as shown in FIG. 1, in order to determine a spatial orientation of the pneumatic actuator 12 from the position sensor signals of the position sensor system 16.

In addition, a sensor line 88 is associated with the processing system 60, which sensor line 88 is connected to the electrical connection 41. The electrical connection 41 is intended for connection to the position sensor 42 as shown in FIG. 1, in order to enable a position determination for the relative position of the working piston 27 along the movement axis 18.

If necessary, it may be provided that the processing system 16 is designed for communication with the manipulator control 21 or with another control (not shown), in particular a programmable logic controller (PLC), and for this purpose comprises a bus line 90 and a bus connection 91.

As an example, it may be provided that the processing system 60 provides information on the spatial orientation of the pneumatic actuator 12 and of the arm section 7 to the manipulator control 21 via the bus line 90 and the bus connection 91, so that the manipulator control 21 can correct an internally calculated orientation for the arm section 7 and the pneumatic actuator 12 attached thereto.

It may also be provided that the manipulator control 21 provides information on forthcoming movements of the manipulator 2 to the processing system 60 via the bus connection 91 and the bus line 90, so that the processing system 60 can control the valve arrangement 65 in order to carry out advantageous processing of the workpiece 19, in particular with a constant contact pressure for the end effector on the workpiece surface 20.

In addition or alternatively, it may be provided that a control system/PLC not shown can provide set points for a force to be transmitted and/or a position to be assumed or maintained to the processing system 60.

A mode of operation for working system 1 can be described as follows: it can be to assumed that controller 15 and the pneumatic actuator 12 are exclusively responsible for influencing a force transmission between manipulator 2 and the end effector/grinding unit 17; such a mode of operation for working system 1 is referred to as force-control (closed loop).

Changing the position and spatial location for the grinding unit 17 is the sole task of manipulator 2.

Accordingly, the pneumatic actuator 12, which is designed as a double-acting pneumatic cylinder, is not primarily used for a feed or retraction movement of the grinding unit 17 along the movement axis 18.

Instead, the pneumatic actuator 12 is used to influence the rigidity and thus the maximum force to be transmitted from the manipulator 2 to the grinding unit 17. This is realized by setting a pressure level in the first working chamber 52 and in the second working chamber 57, resulting in a pressure difference that defines the rigidity of the pneumatic actuator 12.

As an example the manipulator 2 is first aligned in such a way that the arm section 7, the pneumatic actuator 12 and the grinding unit 17 are aligned horizontally. Therefore the movement axis 18 is oriented horizontally without any contact between the grinding unit 17 and the workpiece 19.

Preferably, a pressure difference between the first working chamber 52 and the second working chamber 57 is selected in such a way that there is no resulting force on the working piston 27 which would lead to a movement of the working piston 27 and the piston rod 28 along the movement axis 18.

As an example, this stiffness setting is achieved with a low pressure level in the two working chambers 52 and 57.

As an option a calibration process may be executed. For this calibration the arm section 7, the pneumatic actuator 12 and the controller 15 are moved in at least one predefined spatial orientation to be able to determine a change in pressure in the two working chambers 52 and 57 without a supply of compressed air supply and without a discharge of air from the pneumatic actuator 12. Based on the change in pressure in the two working chambers 52 and 57 the processing unit 60 estimates the influence of weight exerted by the grinding unit 17 in conjunction with the piston rod 28 and the working piston 27 depending on the spatial orientation of the arm section 7.

The data thus obtained regarding the effects of the weight of the grinding unit 17, the working piston 27 and the piston rod 28 are stored in the processing unit 60 and can be retrieved for subsequent workpiece processing.

In addition or alternatively, the properties, in particular the effects of the weight of the grinding unit 17 in conjunction with the piston rod 28 and the working piston 27, can also be determined away from the working system 1 as a function of the spatial orientation of the arm section 7 and stored as a data record or algorithm in the processing system 60.

If, for example, the workpiece 19 is to be processed with a predetermined contact pressure at the point of contact 22, the processing system 60 is designed to first pressurize the first working chamber 52 and the second working chamber 57 with the horizontal alignment of the movement axis 18 as shown in FIG. 1 in such a way that the desired force transfer from the manipulator 2 to the grinding unit 17 can be performed without any significant relative movement of the working piston 27 along the movement axis 18.

Rather, it is intended that the grinding unit 17 will approach the workpiece surface 20 exclusively via the movement of the manipulator 2.

If the spatial orientation of the movement axis 18 changes during the processing the workpiece 19, the weight of the grinding unit 17 and of the working piston 27 and of the piston rod 18 can cause an increase or reduction in the force to be transmitted via the pneumatic actuator 12.

In order to be able to compensate for this change in the maximum transmittable force between the manipulator 2 and the grinding unit 17, which is linked to the spatial orientation of the arm section 7 and the pneumatic actuator 12, the processing unit 60 is designed to correct a differential pressure between the first working chamber 52 and the second working chamber 57 using the position sensor signal of the position sensor system 16 in such a way that the same maximum force can always be transmitted from the manipulator 2 to the grinding unit 17 regardless of the spatial orientation of the movement axis 18.

For an adjustment of the respective working pressure in working chamber 52 or 57, the processing system 60 will individually control the assigned proportional valves 61 and 63 or 62 and 64 in order to adjust the position-dependent pressure difference between the two working chambers 52 and 57, whereby for a particularly precise control of the proportional valves 61 to 64, it may be provided to process the respective sensor signals of the sensors 74 in the processing system 60.

According to an alternative operating mode for the working system 1, it is provided that first of all a rough positioning of the grinding unit 17 is carried out with the aid of the manipulator 2, whereby this rough positioning is carried out in such a way that contact between the grinding unit 17 and the workpiece 19 can be ruled out even taking into account all tolerances, in particular the positioning tolerances of the manipulator 2.

Subsequently, the grinding unit 17 is brought closer to the workpiece by supplying compressed air to the second working chamber 57 and, if necessary, venting the first working chamber 52 in order to bring about a linear movement of the working piston 27, the piston rod 28 and the grinding unit 17.

Preferably, this movement is position-controlled (closed-loop), i. e. by incorporating the position signals which are provided to the processing unit 60 by the position sensor 42 as a function of the linear position of the working piston 27.

When a position of the working piston 27 in relation to the actuator housing 25 is reached, which can be preset within the position control, a switch-over to the force control (closed-loop) as described above and a force-controlled processing of the workpiece 19 is then performed.

What is claimed is:

1. A working system for an application of force onto a workpiece, with a pneumatic actuator comprising an actuator housing to be fixed to a manipulator, wherein a moveable element is movably received in the actuator housing, the moveable element being moveable along a movement axis; with a controller comprising a valve arrangement for supplying compressed air to the pneumatic actuator, further comprising a position sensor system for determining a spatial position of the pneumatic actuator and for providing position-dependent electrical position sensor signals, and further comprising a processing system connected with the position sensor system, said processing system being configured to process the position sensor signals and to provide control signals to the valve arrangement to control a pneumatic supply to the pneumatic actuator as a function of the spatial position of the movement axis, the spatial position being calculated based on the position sensor signals.

2. The working system according to claim 1, wherein an end effector is coupled with the moveable element and wherein the end effector is selected from the group: machining tool for contact-based workpiece machining, measuring tool for contact-based workpiece measurement.

3. The working system according to claim 2, wherein the actuator housing is connected to a manipulator and wherein the manipulator is designed for setting a spatial orientation of the end effector.

4. The working system according to claim 1, wherein the pneumatic actuator is a double-acting pneumatic cylinder and wherein the moveable element is a working piston which is accommodated in a cylinder bore in the actuator housing so as to be linearly movable, the moveable element and the actuator housing delimiting a size-variable first working space and a size-variable second working space, the processing system regulates a differential pressure between the first working space and the second working space in order to influence a relative position of the moveable element with respect to the actuator housing.

5. The working system according to claim 4, wherein a first pressure sensor is connected with the first working chamber or with a supply line extending between the valve arrangement and the first working chamber and the first pressure sensor provides a first electrical pressure signal to the processing system and wherein a second pressure sensor is connected with the second working chamber or with a supply line extending between the valve arrangement and the second working chamber and the second pressure sensor provides a second electrical pressure signal to the processing system.

6. The working system according to claim 4, wherein the valve arrangement comprises a first proportional valve arrangement for a pneumatic supply of the first working chamber, which first proportional valve arrangement is connected to a compressed air source and to an air outlet and to the first working chamber, and wherein the valve arrangement comprises a second proportional valve arrangement for a pneumatic supply of the second working chamber, which second proportional valve arrangement is connected to the compressed air source and to the air outlet and to the second working chamber.

7. The working system according to claim 6, wherein the first proportional valve arrangement and/or the second proportional valve arrangement comprises at least one proportional valve with a position sensor, the position sensor provides an electrical position signal to the processing system which electrical position signal is dependent on a valve position of the proportional valve and/or wherein the valve arrangement comprises a supply connection for a fluid connection with the compressed air source, and wherein a supply pressure sensor is arranged between the supply connection and the valve arrangement and is designed to provide an electrical supply pressure signal to the processing system.

8. The working system according to claim 1, wherein the processing system provides a control of a maximum force exertable by the pneumatic actuator to the end effector on the basis of the position sensor signals, the control being independent from the spatial position of the movement axis.

9. The working system according to claim 1, wherein the processing system provides a control of a position of the moveable element with the end effector attached thereto relative to the actuator housing on the basis of the position sensor signals, wherein the position of the moveable element is independent from the spatial position of the movement axis.

10. The working system according to claim 1, wherein the processing system comprises a bus connection for providing position sensor signals to a manipulator control and/or comprises a bus connection for receiving orientation signals from a manipulator control.

11. A manipulator selected from the group consisting of: tripod, Scara robot, a multi-axis robot, the manipulator comprising a working system for an application of force onto a workpiece, with a pneumatic actuator comprising an actuator housing to be fixed to a manipulator, wherein a moveable element is movably received in the actuator housing and is moveable along a movement axis; with a controller comprising a valve arrangement for supplying compressed air to the pneumatic actuator, further comprising a position sensor system for determining a spatial position of the pneumatic actuator and for providing position-dependent electrical position sensor signals, and further comprising a processing system connected with the position sensor system, which processing system processes the position sensor signals and provides control signals to the valve arrangement to control a pneumatic supply to the pneumatic actuator as a function of the spatial position of the movement axis represented by the position sensor signals.

\* \* \* \* \*